(12) United States Patent
Tesniere et al.

(10) Patent No.: US 10,562,640 B2
(45) Date of Patent: Feb. 18, 2020

(54) TURBINE ENGINE SUSPENSION DEVICE

(71) Applicant: Safran Aircraft Engines, Paris (FR)

(72) Inventors: Marc Patrick Tesniere, Moissy-Cramayel (FR); Maryline Emmanuelle Besnard, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 260 days.

(21) Appl. No.: 15/826,971

(22) Filed: Nov. 30, 2017

(65) Prior Publication Data

US 2018/0155041 A1 Jun. 7, 2018

(30) Foreign Application Priority Data

Dec. 2, 2016 (FR) ...................................... 16 61882

(51) Int. Cl.
*B64D 27/26* (2006.01)
*F01D 25/28* (2006.01)
*F16B 5/02* (2006.01)

(52) U.S. Cl.
CPC ............. *B64D 27/26* (2013.01); *F01D 25/28* (2013.01); *B64D 2027/266* (2013.01); *F16B 5/02* (2013.01)

(58) Field of Classification Search
CPC ................................ B64D 27/00; B64D 27/26
See application file for complete search history.

(56) References Cited

U.S. PATENT DOCUMENTS

| | | | |
|---|---|---|---|
| 5,762,295 A | 6/1998 | McGuire et al. | |
| 6,173,919 B1 * | 1/2001 | Le Blaye | B64D 27/26 244/54 |
| 6,330,995 B1 * | 12/2001 | Mangeiga | B64D 27/26 244/54 |
| 6,494,403 B2 * | 12/2002 | Jule | B64D 27/18 244/54 |
| 7,165,743 B2 * | 1/2007 | Pasquer | B64D 27/26 244/54 |
| 7,325,770 B2 * | 2/2008 | Chevalier | B64D 27/26 244/54 |
| 8,083,177 B2 * | 12/2011 | Renon | B64D 27/26 244/54 |
| 8,413,925 B2 * | 4/2013 | Martinou | B64D 27/26 244/54 |

(Continued)

FOREIGN PATENT DOCUMENTS

| | | |
|---|---|---|
| EP | 1 129 942 A2 | 9/2001 |
| FR | 3 003 896 A1 | 10/2014 |
| WO | WO 2015/177431 A1 | 11/2015 |

*Primary Examiner* — Michael H Wang
(74) *Attorney, Agent, or Firm* — Blank Rome LLP

(57) ABSTRACT

A suspension device for suspending, for example, a turbine engine to a pylon, the device comprising a first unit interposed between a first lug and a second lug of a second unit, the first unit having a bore for passing an axle running through first and second bushings mounted respectively in said first and second lugs; and a clamping unit interacting with the axle. The device further comprising a third bushing mounted in the second lug and having radial centering means which interact with the complementary centering means of a head section of the axle; and a fourth axially slidably mounted bushing, biased axially by the clamping unit, and comprising radial centering means which interact with complementary centering means of the first bushing.

10 Claims, 4 Drawing Sheets

(56) References Cited

U.S. PATENT DOCUMENTS

| | | | | |
|---|---|---|---|---|
| 8,561,942 B2* | 10/2013 | Zheng | ............... | B64D 27/26 |
| | | | | 244/54 |
| 8,613,404 B2* | 12/2013 | Lafont | ............... | B64D 27/26 |
| | | | | 244/131 |
| 9,410,441 B2* | 8/2016 | Macfarlane | ............ | F01D 11/08 |
| 9,592,917 B2* | 3/2017 | Cassagne | ............... | F02C 7/20 |
| 9,593,708 B2* | 3/2017 | Cassagne | ............... | F16B 39/24 |
| 2005/0269445 A1 | 12/2005 | Chevalier et al. | | |
| 2010/0181417 A1* | 7/2010 | Combes | ............... | B64D 27/26 |
| | | | | 244/54 |
| 2016/0076401 A1* | 3/2016 | Besnard | ............... | B64D 27/26 |
| | | | | 248/666 |

* cited by examiner

TURBINE ENGINE SUSPENSION DEVICE

CROSS-REFERENCE TO RELATED APPLICATIONS

This application claims the benefit of French Patent Application No. 1661882, filed Dec. 2, 2016, the contents of which is incorporated herein by reference.

TECHNICAL FIELD

This invention relates to a suspension device, for suspending a turbine engine from a pylon or for suspending any equipment from the body of a turbine engine.

This particularly relates to a situation where a turbine engine, such as a turbojet engine or an aircraft turboprop, is to be suspended from an aircraft structure on which is mounted a fastening unit such as a pylon. The pylon is a structural assembly permanently mounted on the aircraft, that is to say, it remains fixed to the aircraft structure, typically a wing or a fuselage in the case of an aircraft, particularly when removing or installing the turbine engine.

BACKGROUND

The turbine engine is generally suspended from at least one such pylon by means of a "yoke", also known as "outrigger" in this application, which generally has the shape of a bow with two ends each comprising a yoke. Each of the two yokes is connected to the body of the turbine engine, typically at an intermediate casing for turbine engine, via a link rod as for example described in US2005269445A1 or a vibration filtering unit also called "Isolator" as for example described in U.S. Pat. No. 5,762, 295A. The outrigger is part of a device for suspending a turbine engine from a pylon, and is meant to be fixed on the pylon, typically by bolting.

Similar situations can be found in the case of suspending any equipment from the body of a turbine engine.

The assembly of a yoke and a part such as a link rod end or an insulator generally takes place in a configuration where the part is brought between the two lugs of the yoke, before installing an axle that is meant to cross each lug and the part to be fixed to the yoke by clamping the axle using a nut for example. Such devices for mounting an axis on a yoke, in particular for suspending a turbine engine or any equipment, have already been proposed for example in US2016076401A1.

In fact, there are already known solutions in the field where the suspension device comprises:
- a first unit interposed between a first lug and a second lug of a second unit, the first and second lugs respectively having first and second orifices, the first unit having a bore for passing therein an axle (hereinafter often referred to as a through-axle) that runs through first and second bushings respectively mounted in said first and second orifices, the first bushing being slidably mounted within the first orifice;
- a clamping unit interacting with an end section of the through-axle to exert an axial force on the first bushing in order to clamp and axially lock the first unit between the first and second bushings,
- a third bushing mounted in said second orifice of the second lug and free from axial stress with respect to the second bushing.

Bushings are wear parts to protect the holes (such as bores) of the lugs of each yoke of the outrigger. Thus, an axle mounted on a yoke is not directly in contact with the yoke.

Notable among the disadvantages of such an assembly are:
- the possibility of reversing some bushings,
- difficulties in mounting the axle in the first multi-part unit.

In some configurations, the suspension outrigger (yoke) is previously mounted on the pylon while the first unit is mounted in the workshop on the turbine engine. This may be the case, for example, of a pylon arranged laterally on a fuselage of an airplane, with the outrigger fixed to the pylon by means of bolting, including part of the putting in place as well as the clamping which are carried out from inside the fuselage with difficult access. As a result, the aircraft manufacturer can choose to have the outrigger permanently attached to the pylon. To install the turbine engine on the aircraft, it is then necessary for the assembly of the first unit to a yoke of the outrigger to take place not in the workshop but during the docking of the turbine engine on the outrigger fixed to the pylon. The first unit, which must be interposed between the two lugs of a yoke of the outrigger, is moved by means of hoisting the turbine engine, called GSE (Ground Support Equipment). The accuracy of this movement is very relative, the turbine engine being generally raised by a hoist and may even, under certain conditions, be subject to gusts of wind.

However, the axle intended for assembling the first unit to the yoke must pass through the bushings and a cylindrical passage of the first unit with a radial play which may be approximately less than 0.10 mm.

It is therefore almost impossible to align the axle of the cylindrical passage of the first unit with the axles of the bores while respecting such a small radial play, in a docking situation of the turbine engine. Placing the axle in its housing generally requires a forceful insertion to adapt to the vertical misalignment, which usually results in the burn out of the axle, bushings, and the first unit.

A technical problem to be solved is how to integrate the necessary plays to enable mounting the turbine engine without major difficulty in a docking situation and without damaging the axle, the bushings, or the first unit (which may include a structure sometimes called "Isolator").

There could also be need for:
- a solution enabling a reliable security for assembling the axle-yoke, for example, so as not to mount it upside down or to forget bushings,
- integrated plays, necessary for the proper functioning of the assembly and its mechanical strength.

SUMMARY

To provide a useful solution to overcome at least part of the problems, it is proposed that the suspension device presented above as known, and having the above characteristics, is such:
- that the third bushing comprise radial centering means which interact with complementary centering means of a head section of the through-axle,
- and that the device further comprise a fourth axially slidably mounted bushing, biased axially by the clamping unit, and comprising radial centering means which interact with complementary centering means of the first bushing so as to radially center the fourth bushing in relation to the first bushing.

Although the first unit may for example be the body of a thin pylon, the first unit is expected to be multi-part and comprise a tubular part with the said bore for running in the through-axle, the said tubular unit being locked axially between (by) the first and second bushings.

Such first multi-part unit may facilitate the manufacture and/or use of multifunctional parts, such as a fixing unit that can define or include a structure called "isolator" for filtering vibrations transmitted by the turbojet to the aircraft.

It is also proposed that the first and second bushings should each have a shoulder, the said shoulders being located on an inner side of the lugs, respectively.

This will improve the axial support and, in this axial direction, good distribution of efforts between the parts concerned.

It is also expected that the clamping unit being completely mounted, an axial play (Jc hereinafter) be established between the said shoulder of the first bushing and a wall of a housing of the first lug facing it.

Thus, the first bushing may deviate axially from the second bushing until its shoulder comes into contact with the inner side of the first lug, this axial spacing aimed at facilitating the introduction of the said first unit between the two bushes, in particular when this first unit comprises a said tubular part. Moreover, such an axial play Jc will facilitate the adjustment of the operating clearances, the fourth bushing being slidably mounted in its housing provided in the first bushing (radial centering connection, for example conical as aforementioned).

It is also expected that the second and third bushings can be mounted axially tight in said second orifice of the second lug, with an axial play (Jb below) between them, on either side of this second lug. This is a relevant way to ensure freedom from axial stress, vis-à-vis the second bushing and the third bushing mounted in the second orifice of the second lug.

In addition, such axial clearance will avoid any interference with the radially centered connection between the third bushing and the through-axle, each part playing its role at best:
  second bushing: wedging and holding the first unit, between it and the first bushing,
  third bushing: centered passage for the radial centering effect of the through-axle.

Once again for mounting this through-axle without major difficulty and without damaging it or the bushings, it would be an advantage if the fourth bush and said axle, which passes through it, have a slidable mounting between them allowing a radial adjustment of the axle.

This is permitted by the other aforementioned mounting features.

To limit the (axial) tightening loads involved, and the risk of plasticization of the through-axle, while controlling the costs where appropriate, it is furthermore proposed:
  that the clamping unit be a nut, and that, on the side of this nut, the through-axle should have a shoulder such that the said through-axle should have an end section of diameter less than the diameter of a first section of the through-axle between the first and second lugs, the nut being screwed onto the said end section,
  and that the fourth bushing should have a bore equipped with a shoulder which internally has a cylindrical wall slidingly mounted around a cylindrical wall of the said end section, the said shoulder having an axial play (Jd below) with the shoulder of the through-axle.

The fourth bushing will thus be able to transmit the axial clamping applied by the nut to the first bushing once the through-axle axle has been installed through the parts it has to cross, making it possible to axially clamp and lock the first unit between the first bushing and the second bushing.

It is also proposed that the shoulders of the first and second bushings should have different diameters between them and that the housing of the first and second lugs that receive them should equally be of different diameters.

This will better ensure the fact that the first and second bushings cannot be reversed during their assembly.

It is further proposed that the first bushing should have an outer wall in contact with a wall of the first orifice of the said first lug of the said second unit (which can be a suspension hoop).

This will better ensure the efficiency and quality of radial centering between the first and fourth bushings.

Still to facilitate the passage of the through-axle, it is proposed that this device should further comprise a nosepiece with a conical end and which is to be temporarily placed around said end section of the axle to ease the passage of said axle through the bore of the first unit.

Furthermore, there is provision that the first and second bushings may each favorably present a radial clearance (Je and/or Ja below) greater than or equal to 1 mm with respect to the axle passing through them.

This will therefore facilitate the passage and mounting safety of the axle, without adverse effect for axial clamping and locking between the first unit and the lugs of the second unit. This is very favorable to the engagement of the axle in the bore of the first unit and in the conical bushings, thus providing more play during the docking of the engine.

Also concerned by this application is a turbine engine, such as a turbojet or an airplane turboprop engine, equipped with the aforementioned device with all or part of the characteristics successively mentioned.

It should be noted in this description that:
  "radial(ly)" (generally) means radial(ly) to the axis (X1) mounting/dismounting of the said "through-axle". Typically, at least in an interesting case of suspending a turbine engine from a pylon, said axis X1 will be parallel to the revolution axis (X) of the turbine engine, which is the axis along which the fluid flow to be circulated generally runs from upstream downstream,
  "axial(ly)" (generally) means following or parallel to the aforementioned axis (X1),
  and "forward and backward", as "upstream and downstream" locates two respective locations along this X1 axis. "Front" or "upstream" will be closer to the air intake in the turbine engine than the "back" or "downstream" that will be further along the X axis, further downstream.

BRIEF DESCRIPTION OF THE DRAWINGS

The invention will be better understood, if need be, and other details, characteristics and advantages of the invention will appear upon reading the following description given by way of a non-restrictive example while referring to the appended drawings wherein.

DETAILED DESCRIPTION

Figure 1:
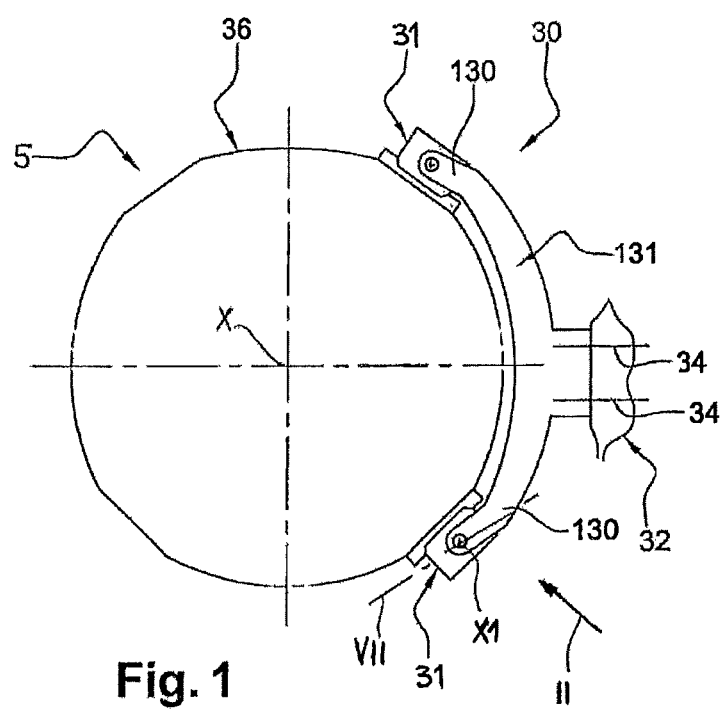
FIG. 1 is a diagrammatic, front (axial) view of an aeronautical turbine engine part equipped with the suspension device of the invention mounted on a structure of an aircraft, such as a pylon fixed to the fuselage of this aircraft.

As shown diagrammatically in FIG. 1, the gas generator 5 of a turbojet comprises a housing part 36, for example an intermediate casing, on which two fixing units 31 are fixed which can each comprise a structure called an "isolator" intended for filtering the vibrations transmitted by the turbojet to the aircraft. The two fixing units 31 are intended to be connected to a suspension part 131, also called "yoke" or "outrigger" in this application, attached to a pylon 32 which is itself attached to the fuselage structure of the aircraft. In the case of a turbojet, the housing portion 36 forms a radial inner wall of a duct through which the secondary flow passes. The two fixing units 31 and the suspension part 131 are therefore located in a secondary flow vein, and constitute an aerodynamic disturbance for the flow.

The suspension device 30 made up of the suspension part 131 and the fixing units 31 thus makes it possible to suspend the turbojet, at its intermediate casing 36, from the pylon 32 of the aircraft. In this example, the pylon 32 is positioned laterally on the fuselage of the aircraft. In this case it can be said that the turbojet is suspended horizontally.

Figure 6:
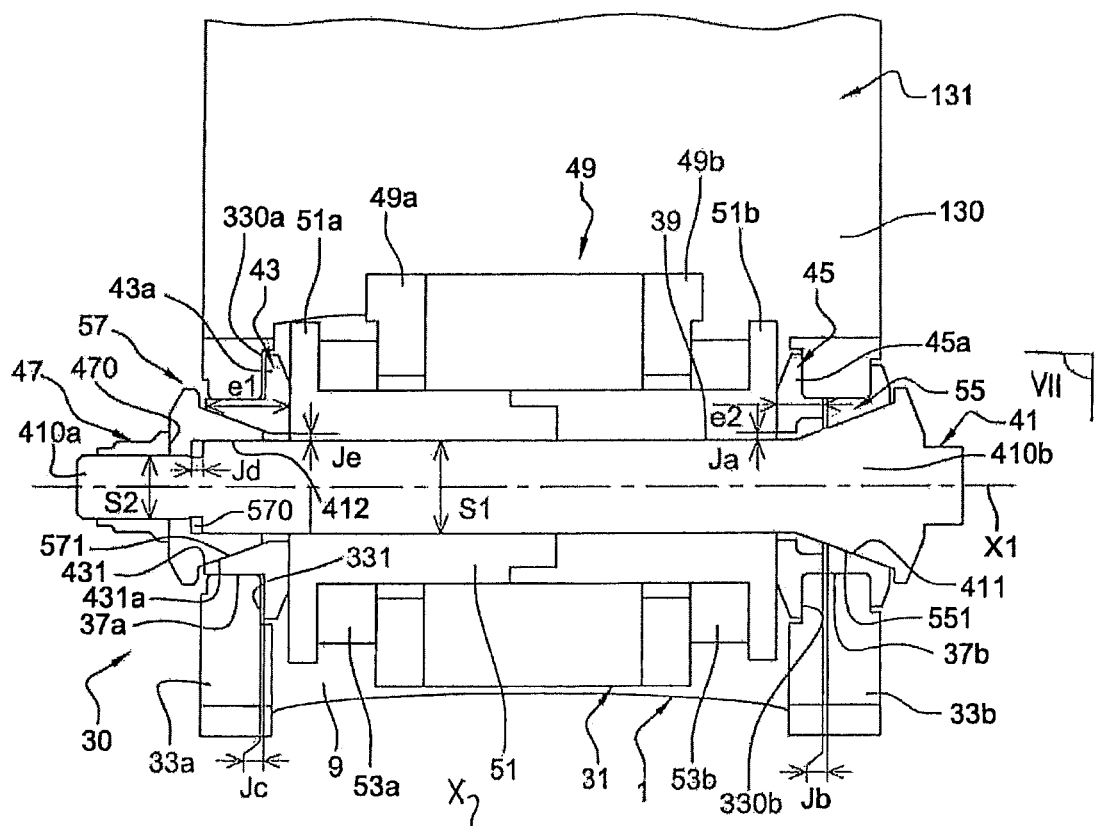
Figure 7:
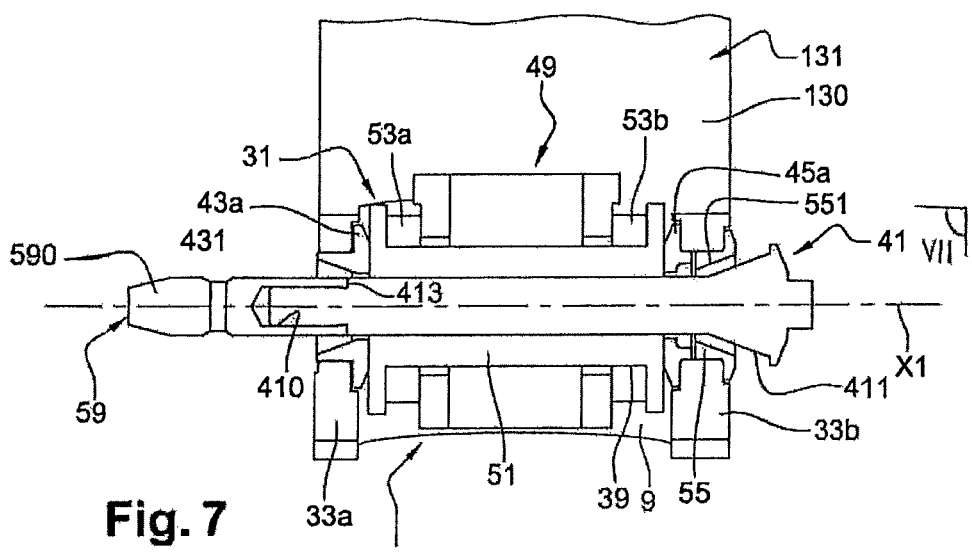

In such a case, provision can be made such that the suspension part 131 is a front or rear suspension yoke of the engine As a whole, the suspension device 30, as shown schematically in FIGS. 6 and 7, comprises:
- a first unit 31, multi-part in this example, axially interposed between a first and a second lug (or yoke) 33a, 33b of a second unit 130, these first and second lugs respectively having first and second orifices 37a, 37b,
- an axial bore 39 formed in a tubular part 51 of said first unit 31,
- a threaded shaft 41 passing through the bore 39 and first and second bushings 43, 45 respectively mounted in said first and second orifices 37a, 37b,
- A clamping unit 47, such as a nut, interacting with a front portion, also called terminal section, 410a of the through-axle 41, for clamping and axially locking together the first unit 31 and lugs 33a, 33b.

The end section 410a is the one that is axially opposite to that 410b, called the rear portion or head section, provided with complementary centering means 411 intended to interact with the radial centering means 551 of the third bushing 55 that is presented below.

The through-axle 41 is mounted horizontally—according to the preferred illustrated mounting—along the X1 axis, parallel to the motor spindle or longitudinal axis, X.

The first unit 31 may be carried by (directly or for example by bolting) of the gas generator 5 of the turbine engine, more precisely of its intermediate casing 36 (FIG. 1).

The lugs (or yokes) 33a, 33b can be carried by with the suspension outrigger 131 by which the turbine engine is here suspended from the pylon 32.

Thus, the second unit 130 may be formed by any one of the two ends of the suspension yoke 131.

This suspension outrigger 131 may be in the form of an arch.

In the example, the first unit 31 is multi-part and comprises a clamping unit 49 (which may be the so-called "insulator" structure), the tubular part 51 mounted with a radial clearance in the fixing unit 49, and two elastomer sleeves 53a, 53b.

The two elastomeric sleeves 53a, 53b are mounted along the X1 axis between two shoulders 51a, 51b of ends of the tubular part 51 and respectively two metal flanks 49a, 49b of the fixing unit 49.

It is therefore understandable that the first unit 31, which can therefore be multi-part, can help filter the vibrations transmitted by the turbojet to the aircraft via the suspension outrigger 131, which can be directly attached to the pylon 32 as shown in FIG. 1 without the need for an intermediate device for filtering vibrations.

Figure 2:
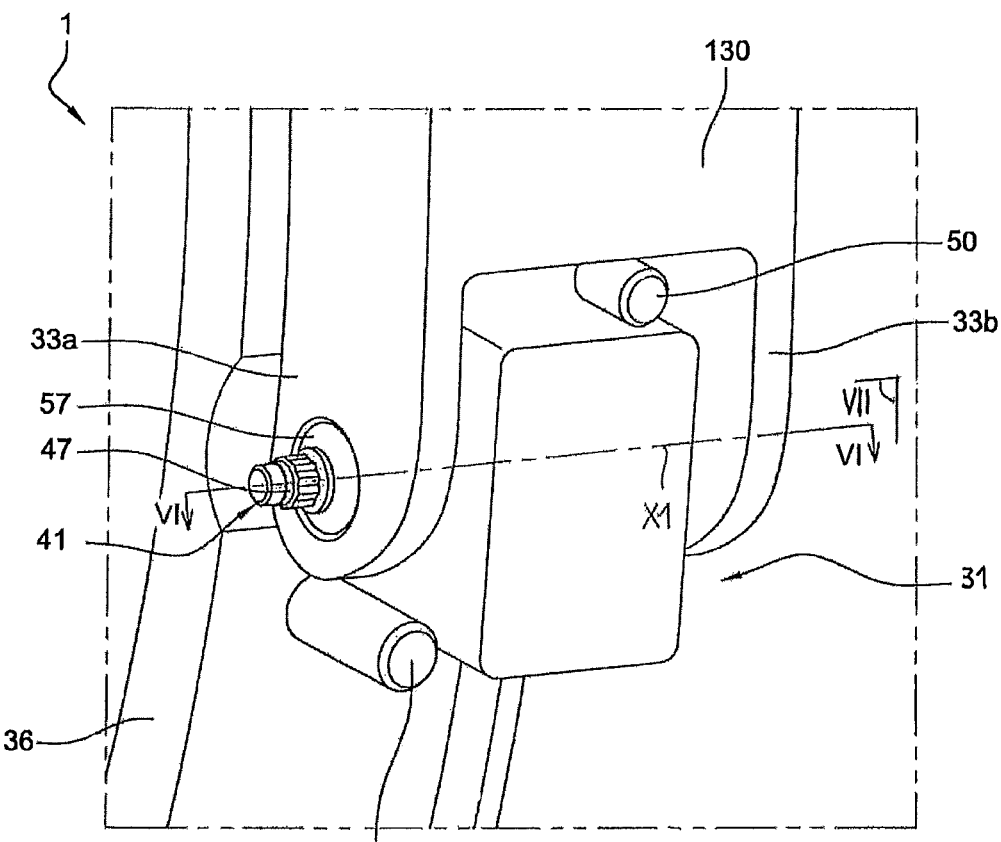
FIGS. 2 and 3 show details of the suspension device, corresponding respectively to perspective and front views along arrow II of FIG. 1.
Figure 3:
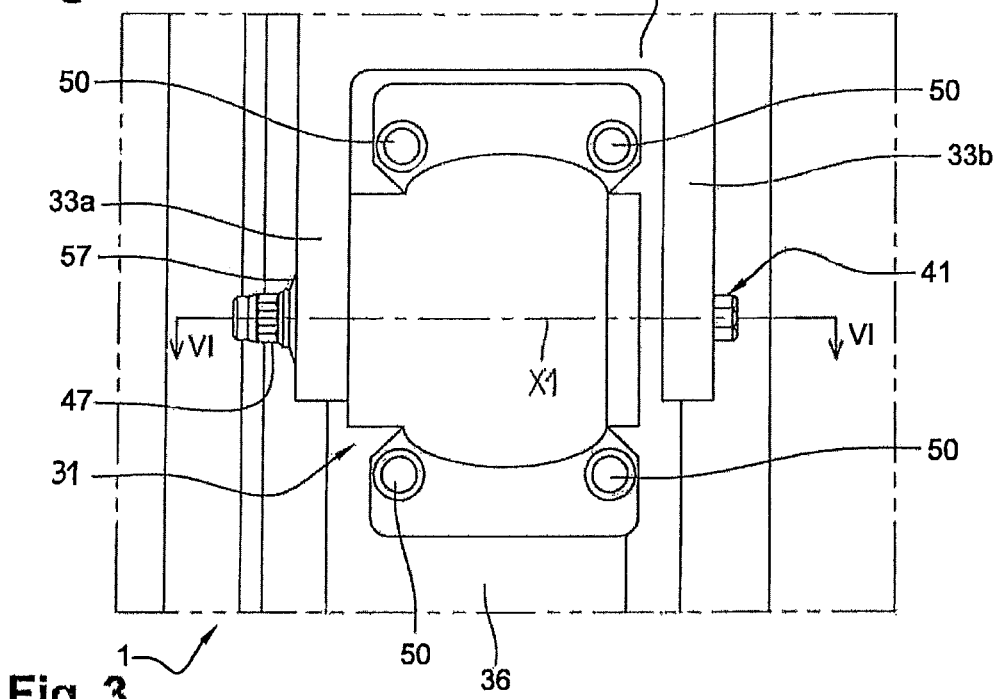

As shown in FIGS. 2 and 3, screws 50 secure the first unit 31 to a motor housing, here the intermediate casing 36.

From the second to the first of the two lugs (or yokes) 33b, 33a, the through-axle 41 passes through the tubular part 51 around which are mounted the elastomeric sleeves 53a, 53b and the metal unit 49, axially (X1 axis) clamped between the shoulders 51a, 51b of the tubular part 51.

To allow its implementation, the tubular part 51 may be in several parts, such as the two parts as shown.

To ensure, as mentioned above:
- the plays necessary to allow an assembly without major difficulty, without damaging the axle 41, the bushings, or the first unit,
- and those needed for the proper functioning of the assembly and its mechanical strength, it is further proposed that:
  - a third bushing 55 be mounted in said second orifice 37b of the second lug 33b,
  - the third bushing 55 comprise radial centering means 551, such as a conical radial surface, which interact with complementary centering means 411, such as another conical radial surface, of the head section 410b of the through-axle 41,
  - and that the device 30 further comprise a fourth axially slidably mounted bushing 57, biased axially by the clamping unit 47, and comprising radial centering means 571 which interact with complementary centering means 431 of the first bushing 43 so as to radially center the fourth bushing in relation to the first bushing.

The respective radial centering means 431 and 571 may once again comprise interacting conical radial surfaces, in mutual contact, it being specified that the conical radial surfaces could be replaced by curved profiles.

The third bushing 55 is free of axial stress vis-à-vis the second bushing 45 Suspension device 30 mounted, with its axially tight parts, make sure one of these bushes 45, 55 does not push axially on the other. For this to happen, the second and third bushings 45,55 may be mounted axially tight in the second hole 37b of the second lug, with an axial play Jb between them, on either side of the second lug 33b. It will also limit the risk of interference between the second bushing 45 and the radial centering connection established between the third bushing 55 and the through-axle 41, each part playing its role at best.

The fourth bushing 57 will preferably be mounted directly around the through-axle 41 and in the first bushing 43.

In order to secure the support of the first and second bushings 43, 45 axially against the tubular part 51 during the clamping of the axle, these bushings may furthermore each have a shoulder, respectively 43a, 45a, these shoulders being located on one inner side of the lugs, respectively (so towards the first unit 31 and its tubular part 51).

To enhance the engagement of the through-axle 41 in the bore 39 of the first unit 31 and in the bushings, thereby allowing more radial clearance when the engine is docked, with such a radial clearance that can even be approximately a mm (or even several mm), it is also proposed that, as illustrated, the first and second bushes 43,45 each have a radial clearance Ja, Je with respect to the axle 41 which passes through them. This radial clearance is preferably greater than or equal to 1 mm.

The present assembly will therefore allow the presence of a play of approximately a mm and even more.

Furthermore, it is proposed, to facilitate the axial mounting of the through-axle 41, so that the fourth bushing 57 and the said axle 41 which passes pass therethrough between them should have a sliding radial adjustment (smooth portion 412 unthreaded).

Beyond that, towards its axial end opposite the cone 411, the through-axle 41 will preferably have a shoulder engaging the front-end section, 410a which, in turn, is threaded.

Indeed, to limit the (axial) tightening loads in play, and, of course, the risk of plasticization of the through-axle 41, while controlling costs, it is recommended that, on the side of the nut 47, the through-axle 41 present this end section 410a shouldered, so that, in front of this nut, said axle 41 should have a terminal section S2 of smaller diameter than that of a main section S1 that the axle 41 has between the first and second lugs 33a, 33b.

As for the adjustment of the operating clearances, it will be facilitated if the first bushing 43 is slidably mounted in the first orifice 37a and if the second bushing 45 is mounted tightly in the second orifice 37b.

An axial play Jc will also be established between the shoulder 43a of the first bushing 43 and the inner side 331 facing it from the first lug 33a.

Also for the crossing of said axle 41, it is proposed that the fourth bushing 57 should have a bore equipped with a shoulder 570 making its section pass substantially from S1 to S2, the shoulder 413 of the axle 41 and that of the fourth bushing should have an axial play Jd between them.

A tightening load of the relatively limited nut 47 will then be sufficient for the fourth bushing 57 to act effectively on the axle 41.

In addition, to prevent the first and second bushings 43, 45 from being reversed during assembly, it is advisable to:
that the shoulders 43a, 45a of the first and second bushings should have different diameters between them and that the housing 330a, 330b of the first and second lugs 33a, 33b that receive them should equally be of different diameters;
and/or that the first bushing 43 has axially a thickness e1 (X1 axis) greater than that e1 of the second bushing 45.

Figure 4:
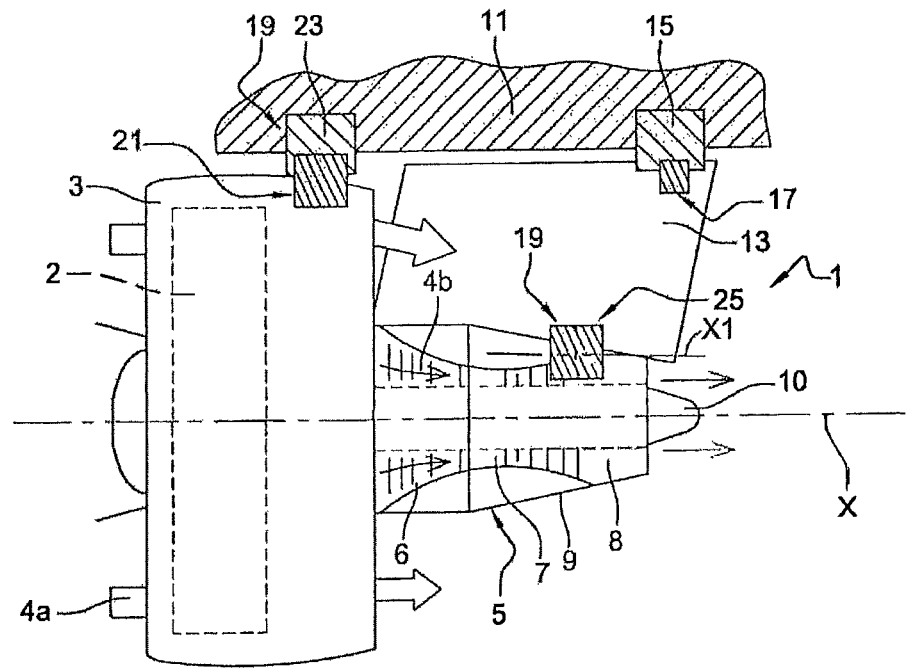
FIG. 4 is a diagrammatic view, partly lateral, partly in section, of a longitudinal partial half-section of another example of an aircraft turbine engine mounted on an aircraft, under a wing seen in section, and equipped with the suspension device of the invention.

And to further facilitate the mounting or even the axial disassembly of the through-axle 41, it is proposed, as shown in FIG. 4, that a nosepiece 59 having a conical axial end 590 be temporarily arranged around the end portion 410a with reduced section S2 of the through-axle 41.

Once the axle 41 mounted through the bores of the device, along the X1 axis, the nosepiece 59 which has an engageable hollow portion will be removed, for example, by screwing around the end portion 410a.

The mounting of this through-axle 41 can be carried out as follows:
first, tight assembly of the second and fourth bushings 45, 55 in the second orifice 37b of the second lug 33b,
sliding assembly of the first bushing 43 in the first orifice 37a of the first lug 33a,
said vertical docking, that is to say perpendicular to the X1 axis, of parts 49,51 of said first multi-part unit 31, with also the elastomeric sleeves 53a, 53b already mounted between the first and second bushings 43, 45. This docking is made possible by the operation axial play Jc of the first bushing 43, since it can deviate axially from the second bushing 45 until its shoulder 43a comes into contact with the inner side 331 of the first lug 33a facing it, the axial spacing between the first and second bushings 43, 45 then being somewhat greater than the axial length of the tubular part 51 to facilitate the introduction of this tubular part between the two bushings,
axial assembly of the through-axle 41, by successive passage in the bushings 55 and 45, then in the tubular part 51 of the insulator 49, and in the first bushing 43,
mounting the fourth bushing 57 in its housing provided on the first bushing 43, and on the through-axle 41; at this stage, the fourth bushing 57 is not completely in position in its housing of the bushing 43, all the less if the through-axle 41 is off-center having used the radial clearances Ja and Je allowed respectively by the first and second bushings 43, 45,
axial tightening of the nut 47, which brings the respective conical radial surfaces 571 and 431 of the bushings 57 and 43 completely into contact with each other and recenter of the through-axle 41 with the tubular part 51 of the isolator 49.

During this tightening, the conical portion 411 of the through-axle 41 is wedged in its conical seat 551 of the third bushing 55, recentering the through-axle 41 on the X1 axis.

The suspension device of the invention can find applications in other examples of mounting an aircraft turbine engine on an aircraft. Particularly in the case of a turbofan engine with a high dilution ratio, the radial dimensions of the fan and its casing are relatively large compared to the radial dimensions of the gas generator casing. The tower on which the suspension device of the gas generator is mounted can extend over a relatively large radial height, so as to come sufficiently close to a housing portion of the gas generator on which a relatively, radially compact suspension device is installed.

Figure 5:
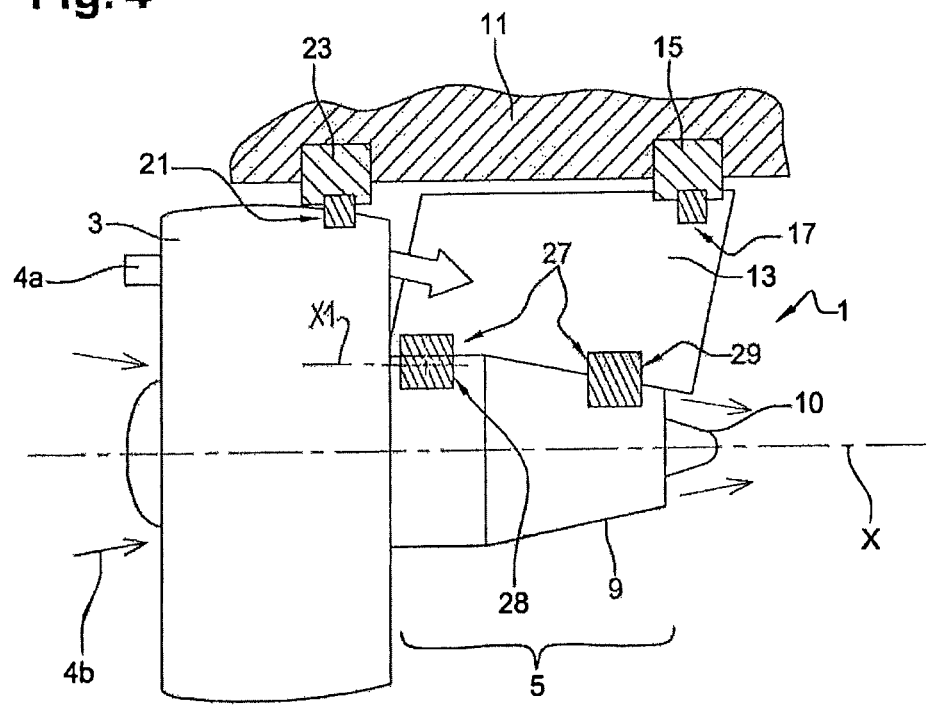
FIG. 5 is an identical view to that of FIG. 4, with an alternative arrangement of the suspension device of the invention, FIGS. 6,7 correspond to section VI-VI of FIG. 2 or 3, in plane VII of FIG. 1 which includes the X1 axis, this at two different moments of mounting of the through-axle.

An example of a turbofan with a high bypass ratio is shown very schematically in FIGS. 4 and 5. The fan 2 at the front of the turbofan rotates about the X axis of the engine in the fan casing 3, for the passage of the secondary flow 4a. Downstream (or further back along the X axis), the gas generator 5 is housed inside a housing assembly(ies) 9. The gas generator 5 comprises the compression stages 6 downstream (or at the rear) of the fan, the combustion chamber 7 and the turbine stages 8 where the gases of the primary flow 4b pass. Downstream, the gas generator 5 comprises an exhaust cone 10 around which flows in particular the burnt gases of the primary flow 4b.

Two fastening methods of such a turbine engine are shown in FIGS. 4 and 5 and relate to the invention.

In the first fastening method (FIG. 4), the engine is suspended or hooked under the wing 11 at the rear of an aircraft via a rigid structure forming a pylon 13.

Axially, the pylon 13 extends between the fan casing 3 and a rear spar 15 of the wing 11.

At the back, the pylon 13 is attached to the rear spar 15, by means of conventional attachments 17 which may include bolts and nuts.

The hoisting of the engine is generally provided by suspensions, generally identified at 19 and comprising:
- a front hoisting means 21 between the fan casing 3 and a structure 23 of the aircraft, which here can be a front spar of the wing 11, and,
- a rear hoisting means 25 between a rear portion of the housing assembly (s) 9 and the pylon 13.

At least one of the hoisting means 21, 25 may comprise a suspension device according to the invention.

If necessary the other of these hoisting means may comprise at least one ball joint device corresponding to what is disclosed in U.S. Pat. No. 9,581,047B2—the description of which is included by reference—where, however, there is no radial play allowed by the bushings for a facilitated assembly of the axle (with a cylindrical body which passes through the cylindrical bore of the ball joint). In addition, the assembly of a suspension yoke to the motor by means of the ball joint device of U.S. Pat. No. 9,581,047B2 is preferably carried out on an engine in the workshop to successfully enter the axle without damaging the bushings or the ball, and of course without docking constraint.

It should be noted that the fan casing may be extended downstream by an intermediate casing located in the extension, along the X axis, of the fan casing. For the sake of simplicity, the fan casing and the intermediate casing are here represented together by the same part 3. The front hoisting means 21 then connects the intermediate casing to the structure 23 of the aircraft.

In the second method of attachment (FIG. 5), there is the pylon 13 fixed rearwardly to the rear spar 15 by the conventional fasteners 17.

The hoisting of the engine is generally provided by suspensions, generally identified at 27 and comprising:
- a front hoisting means 28 between here a front part of the housing assembly(ies) 9 and a front part of the pylon 13, and,
- a rear hoisting means 29 between a rear portion of the said housing assembly(ies) 9 and the pylon 13.

As in the case of FIG. 4, at least one of the hoisting means 28, 29 may comprise a suspension device according to the invention.

The suspension device according to the invention, generally 30 indicated in FIG. 6, can be used in particular in the two cases above (FIGS. 4 and 5) described as illustration, and can therefore correspond to at least one of the hoisting means 21, 25, 28, 29.

In the case where the suspension device 30 corresponds to at least one of the means 25, 28, 29 for suspending the gas generator 5 to the pylon 13, the first unit 31 may consist of a part such as a link rod end or an insulator, mounted on a housing of the gas generator 5 and intended to be interposed between a first and second lugs 33*a*, 33*b* of the second unit 130. This second unit 130 may consist of a yoke of an outrigger fixed to the pylon 13, under the pylon. Such a configuration makes it possible to keep the yoke fixed to the pylon during the installation or the removal of the turbine engine, the assembly between the first unit 31 and the second unit 130 made possible in a docking situation of the turbine engine during its installation.

Alternatively, especially where the pylon 13 (hitherto called end pylon) has a relatively small thickness, for example less than 250 mm, at least at its interface with the outrigger, can be expected to mount the outrigger on the turbine engine before the docking of the turbine engine during its installation. It may further be provided to fix the outrigger to the pylon during the docking of the turbine engine on the pylon by a fixing device comprising an upper yoke carried by the yoke and a through-axle passing through the yoke and the pylon. The first unit 31 then consists of a portion of the pylon that has a bore formed in its thickness for the passage of the axle. The invention makes it possible to accommodate a misalignment, during docking, between the respective geometric axes of this bore and the orifices of the yoke.

Furthermore, as mentioned at the beginning of the text, equipment is suspended on a turbine engine part, it can be provided that a fastener be attached to the turbine engine to receive the equipment. In this case, the fastening unit comprises yokes on which the equipment is mounted, for example by means of link rods or isolator units which are fixed to the yokes by axles and bushings in accordance with the provisions described in the foregoing. During assembly or disassembly of the equipment, the fastening unit remains attached to the turbine engine.

The invention claimed is:

1. A suspension device for suspending at least one of a turbine engine on a structural unit of an aircraft and equipment from a body of a turbine engine, the device comprising:
    - a first unit interposed between a first lug and a second lug of a second unit, the first lug and second lug respectively having a first orifice and a second orifice, the first unit having a bore for passing therein a through-axle that runs through a first bushing and a second bushing respectively mounted in said first orifice and second orifice, the first bushing being slidably mounted within the first orifice;
    - a clamping unit interacting with an end section of the through-axle, to exert an axial force on the first bushing to clamp and axially lock the first unit between the first bushing and the second bushing;
    - a third bushing mounted in said second orifice of the second lug and free from axial stress with respect to the second bushing, wherein the third bushing comprises radial centering means which interact with complementary centering means of a head section of the through-axle; and
    - a fourth axially slidably mounted bushing, biased axially by the clamping unit, and comprising radial centering means which interact with complementary centering means of the first bushing so as to radially center the fourth bushing in relation to the first bushing.

2. The suspension device according to claim 1, wherein the first unit is multi-part and comprises a tubular unit having said bore for passing therein the through-axle, said tubular unit being locked axially between the first bushing and the second bushing.

3. The suspension device according to claim 1, wherein the first bushing and the second bushing each have a shoulder, said shoulders being located on an inner side of the first lug and the second lug, respectively.

4. The suspension device according to claim 3, wherein the clamping unit being completely mounted, an axial clearance is established between the shoulder of the first bushing and a wall of a housing of the first lug facing it.

5. The suspension device according to claim 3, wherein the shoulders of the first bushing and the second bushing have different diameters between them and housings of the first lug and the second lug which receive them have diameters different from each other.

6. The suspension device according to claim 1, wherein:
    - the clamping unit is a nut, and on a side of the nut, said through-axle has a shoulder such that an end section of said through-axle has a diameter that is less than a diameter of a main section of the through-axle, the nut being screwed onto said end section; and the fourth bushing has a bore having a shoulder which internally has a cylindrical wall slidably mounted around a cylindrical wall of said end section, said shoulder of the fourth bushing having an axial play with the shoulder of the through-axle, wherein the main section of the through-axle is between the first lug and the second lug.

7. The suspension device according to claim 6, further comprising a nosepiece with a conical end and which is to be temporarily arranged around said end section of the through-axle to enhance the passage of said through-axle through the bore of the first unit.

8. The suspension device according to claim 1, wherein the second bushing and the third bushing are mounted axially tight in said second orifice on either side of said second lug, with an axial clearance between them.

9. The suspension device according to claim 1, wherein the first bushing and the second bushing each have a radial clearance greater than or equal to 1 mm with respect to the through-axle which passes there through.

10. A turbine engine equipped with the suspension device according to claim 1.

* * * * *